(12) United States Patent
Goo

(10) Patent No.: US 10,853,340 B2
(45) Date of Patent: *Dec. 1, 2020

(54) STATIC SORTED INDEX REPLICATION

(71) Applicant: Amazon Technologies, Inc., Seattle, WA (US)

(72) Inventor: Almann T. Goo, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 305 days.

This patent is subject to a terminal disclaimer.

(21) Appl. No.: 14/629,079

(22) Filed: Feb. 23, 2015

(65) Prior Publication Data

US 2015/0169658 A1   Jun. 18, 2015

Related U.S. Application Data

(63) Continuation of application No. 13/567,947, filed on Aug. 6, 2012, now Pat. No. 8,965,849.

(51) Int. Cl.
*G06F 16/22* (2019.01)

(52) U.S. Cl.
CPC ................ *G06F 16/2246* (2019.01)

(58) Field of Classification Search
CPC ................................ G06F 16/2246
See application file for complete search history.

(56) References Cited

U.S. PATENT DOCUMENTS

| | | | | |
|---|---|---|---|---|
| 6,381,609 B1* | 4/2002 | Breitbart | ........... | G06F 17/30356 |
| 7,483,906 B2* | 1/2009 | MacCormick | .... | G06F 17/30091 |
| 7,792,839 B2 | 9/2010 | Hrle et al. | | |
| 8,965,849 B1 | 2/2015 | Goo | | |
| 2007/0079004 A1* | 4/2007 | Tatemura | .............. | G06F 9/5044 |
| | | | | 709/238 |
| 2007/0288530 A1* | 12/2007 | Romem | .............. | G06F 11/1471 |
| 2007/0299804 A1* | 12/2007 | Liu | ................... | G06F 17/30545 |
| 2011/0035359 A1* | 2/2011 | Bendakovsky | ..... | G06F 11/1458 |
| | | | | 707/640 |
| 2013/0110766 A1* | 5/2013 | Promhouse | ............. | G06F 9/466 |
| | | | | 707/607 |
| 2013/0332484 A1* | 12/2013 | Gajic | ................ | G06F 17/30286 |
| | | | | 707/770 |

OTHER PUBLICATIONS

O'Neil, Patrick, et al. "The log-structured merge-tree (LSM-tree)." Acta Informatica 33.4 (1996): 351-385.*
Anindya Basu et al, How do I save a binary tree to an array of in-order traversal?, https://www.quora.com/How-do-I-save-a-binary-tree-to-an-array-of-in-order-traversal (Year: 2016).*

(Continued)

*Primary Examiner* — James Trujillo
*Assistant Examiner* — Kurt A Mueller
(74) *Attorney, Agent, or Firm* — Robert C. Kowert; Kowert, Hood, Munyon, Rankin & Goetzel, P.C.

(57) ABSTRACT

Static sorted index replication is described. A method may include receiving data to store in a memory tree of a replica in a partitioned distributed data store. The method may also include storing the received data in the respective memory tree of one of a plurality of replicas. The method may further include storing the received data sequentially in a static sorted index.

20 Claims, 5 Drawing Sheets

(56) References Cited

OTHER PUBLICATIONS

Chaitanya Singh, Java—Static Class, Block, Methods and Variables, https://beginnersbook.com/2013/04/java-static-class-block-methods-variables/ (Year: 2017).*

Anonymous, 10.1 BinaryHeap: An Implicit Binary Tree, https://opendatastructures.org/ods-java/10_1_BinaryHeap_Implicit_Bi.html (Year: 2008).*

Anonymous, Binary Tree to Array, https://www.dreamincode.net/forums/topic/135987-binary-tree-to-array/ (Year: 2009).*

Peter Muth, Patrick O'Neil, Achim Pick, Gerhard Weikum "Design, Implementation, and Performance of the LHAM Log-Structured History Data Access Method" Proceedings of the 24th VLDB Conference, New York, NY 1998 pp. 452-463.

Michael A Bender, Martin Farach-Colton, Bradley C Kuszmaul "Cache-Oblivious String B-trees" PODS'06 Jun. 26-28, 2006, Chicago, Illinois USA, Copyright 2006 ACM pp. 233-242.

Jan Stender et al. BabuDB: Fast and Efficient File System Metadata Storage, 2010 International Workshop on Storage Network Architecture and Parallel I/Os, Incline Village, USA, May 2010, pp. 51-58.

* cited by examiner

STATIC SORTED INDEX REPLICATION

This application is a continuation of U.S. patent application Ser. No. 13/567,947, filed Aug. 6, 2012, now U.S. Pat. No. 8,965,849, which is hereby incorporated by reference in its entirety.

BACKGROUND

For various data stores, index storage often becomes highly fragmented in the face of random writes. One example of an index store that becomes highly fragmented from random writes is a B+ Tree based index store (e.g., Berkeley DB (BDB), InnoDB, etc.). Traditional B+ Trees perform well for sequential writes and random-access search but suffer greatly when faced with highly entropic (random) writes. B+ Tree based index stores degrade and become blocked by random I/O for insertion, which may only be a mere fraction of hard disk or solid-state drive (SSD) bandwidth. Further, range queries on such aged trees suffer due to leaf nodes being scattered on the disk. Such fragmentation also increases the total cost of ownership (TCO) of the data store in terms of overhead to store the index store, and speed to recover the store from disaster (e.g., iterating over the index store can cost O(N) random seeks on disk).

Figure 1:
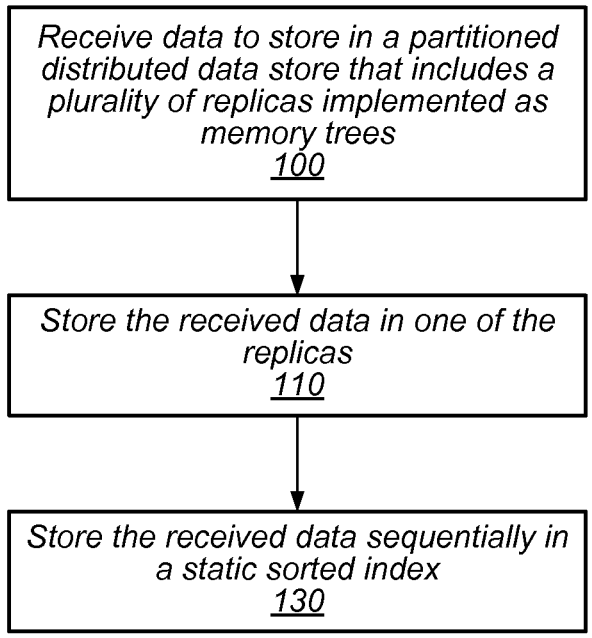
FIG. 1 is a flow diagram of static sorted index replication, according to some embodiments.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present invention as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"First," "Second," etc. As used herein, these terms are used as labels for nouns that they precede, and do not imply any type of ordering (e.g., spatial, temporal, logical, etc.). For example, for a system configured to perform static sorted index replication, the terms "first" and "second" replicas can be used to refer to any two replicas. In other words, the "first" and "second" replicas are not limited to logical replicas 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of systems and methods for static sorted index based (e.g. log structured merge (LSM)-based) replication are disclosed. Various ones of the present embodiments may include creating a static sorted index that is live queryable and that may answer range queries more efficiently than fragmented index replicas. In some embodiments, the static sorted index may compressed and may be used as a snapshot for garbage collection to replace fragmented index replicas and/or for disaster recovery (e.g., to replace a failed index replica)

The specification first describes a flowchart of one embodiment of a method for static sorted index replication, followed by flowcharts for using the static sorted index for: merging and garbage collection, disaster recovery, and performing queries. The specification then describes an example system that may implement the disclosed static sorted index updating and merging techniques, followed by example querying on the static sorted index. Various examples are provided throughout the specification.

Turning now to FIG. 1, one embodiment of a method for static sorted index replication is depicted. While the blocks are shown in a particular order for ease of understanding, other orders may be used. In some embodiments, the method of FIG. 1 may include additional (or fewer) blocks than shown. Blocks 100-120 may be performed automatically or may receive user input. Additionally, the method of FIG. 1 may be used in conjunction with one or more blocks of the methods of FIGS. 2-4.

At 100, data may be received. The received data may also be referred to as an update message, an insert message, an upsert (update/insert) message, and/or a dataset. A dataset may refer to a single item of data (e.g., a single bit of data) or it may refer to multiple separately storable items of data, such as multiple blocks of data (e.g., 64 KB, 256 KB, 1 MB, etc.). A dataset may correspond to a logical collection of records, which may be stored in one or more index replicas, as described herein. Examples of data/records may include price changes for items for sale, inventory for items for sale, catalog information, customer cart information, etc.

The data may be storable in a partitioned (e.g., hash-partitioned) distributed data store. In some embodiments, such a data store may be a key-value store, such as a NoSQL database service (e.g., DynamoDB offered by Amazon Web Services), or some other data store. In one embodiment, the data store may include multiple stores, such as a combination of DynamoDB and some other data store. In such an example, the multiple different data stores may collectively be referred to as a data store, or they may be referred to as multiple data stores.

The distributed data store may include a plurality of index replicas that are implemented as data structures in memory trees. For example, memory trees may be b-trees (e.g., b+ trees), such as those used in Berkeley databases (BDBs), BDB Java Edition, or LevelDB. As described herein, the distributed data store may also include one or more static sorted index replicas apart from the plurality of index replicas.

As illustrated at 110, the received data may be stored in one of the plurality of replicas. For example, the data may be stored in the memory tree of one of the plurality of replicas. Storage (writes) of the data in the replica may be highly entropic (e.g., random).

Additional data may also be received and stored in one of the replicas. As the storage of the data in the replicas may be random, over time, the data in the replicas may be highly fragmented. The fragmentation may cause the replicas to degrade and become blocked by random I/O for insertion.

As shown at 120, the data may be stored sequentially in a static sorted index of the partitioned data store. The static sorted index is sorted in that the data is stored sequentially in the index. Moreover, note that after the data is stored sequentially in the static sorted index, the data in the index may be made static (e.g., read only). Until data is stored sequentially in the static sorted index, however, it may be writeable. The static sorted index may also be referred to as an index data structure or replica. In various embodiments, the static sorted index may not be implemented in the same manner as the plurality of replicas. For example, instead of being implemented as a simple b-tree, the static sorted index may be log structured merge (LSM)-based (e.g., as Sorted String Tables (SSTables)) or may be based on other schemes, such as Cache Oblivious Lookahead Array (COLA). In a COLA embodiment, the index may be implemented as a cache oblivious streaming b-tree.

As part of block 120, the static sorted index may be generated and data from the in-memory trees (e.g., red-black tree, skip list (for a concurrent implementation), etc.) of the replicas may be stored into the generated static sorted index. In some embodiments, creation/generation of a static sorted index may be performed as a batch commit of received data. For example, a new static sorted index may not necessarily be created each time data is received. Instead, in such embodiments, a static sorted index may be created periodically (e.g., after a certain period of time, such as once an hour, 3 times a day, etc.), after a certain amount of data has been received (e.g., after every 64 KB of data is received, etc.), or upon encountering a system failure (e.g., failure of a replica), etc. Accordingly, until the static sorted index is generated and data is stored sequentially in that static sorted index, various received data may be stored randomly amongst one or more of the plurality of replicas resulting in fragmented replicas. Note that over time, the method of FIG. 1 may be repeated such that multiple static sorted indexes exist. For example, in an embodiment in which the static sorted index is performed periodically once an hour, after three hours, three separate static sorted indexes may exist.

Data may be stored sequentially in the static sorted index according to a number of different techniques. For example, data stored in the various fragmented replicas may be associated with respective timestamps, key, or other indication of an order. The data may then be ordered in the static sorted index according to the indication of the order. In one embodiment, an indication of the data received at 100 may be stored in one or more transaction logs. A common transaction log may be associated with each of the plurality of replicas or each replica may be associated with its own transaction log.

In some embodiments, the static sorted index may be used along with another data store for durable backup. For example, the other data store may be an online storage web service, such as S3 offered by Amazon Web Services, which provides storage through web services interfaces, such as REST, SOAP, and BitTorrent™, or some other data store.

In some embodiments, the static sorted index may be slipped into the final tier of a B+ Tree to create a hybrid 2-level LSM tree where live updates are made in the B+ Tree.

In various embodiments, received data is described as being written to various ones of the replicas (e.g., B+ Tree replicas). In some embodiments, the sorted index may not be static and data may be written directly to the sorted index.

In some embodiments, as described herein, a segment for bloom filters may be added to the static sorted indexes to increase query performance.

As will be described in more detail at FIGS. 2-4, the static sorted index may be used for garbage collection, disaster recovery, and for performing queries (e.g., range queries).

Figure 2:
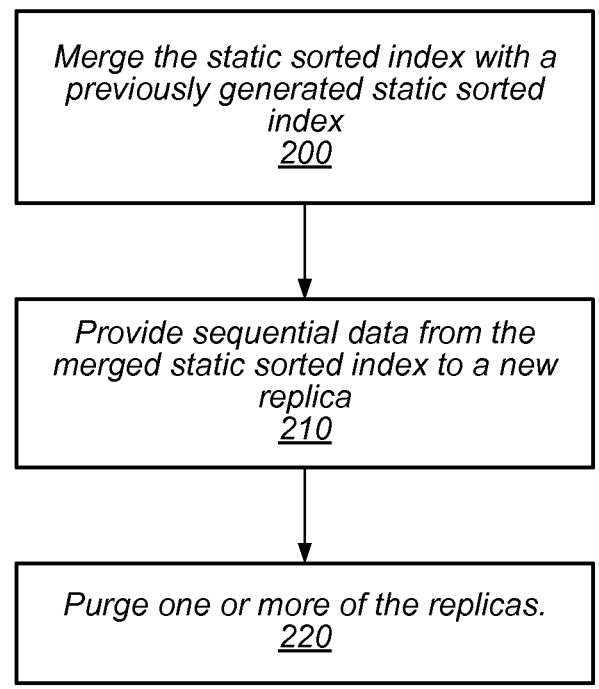
FIG. 2 is a flow diagram of using a static sorted index for a merge and garbage collection process, according to some embodiments.

Turning now to FIG. 2, one embodiment of a method for using a static sorted index for merging and garbage collection is depicted. While the blocks are shown in a particular order for ease of understanding, other orders may be used. In some embodiments, the method of FIG. 2 may include additional (or fewer) blocks than shown. Blocks 200-220 may be performed automatically or may receive user input. Additionally, the method of FIG. 2 may be used in conjunction with one or more blocks of the methods of FIGS. 1 and 3-4.

As noted above, multiple static sorted indexes may exist. As shown at 200, the static sorted index (e.g., from block 120) may be merged, or compacted, with one or more previously generated static sorted indexes. The result of the merge may be a single merged static sorted index. As a simple example, consider a scenario in which three static sorted indexes have been generated. The three static sorted indexes may be merged into a single static sorted index. As a result, the sorted data from the three indexes is sequentially stored in the single static sorted index such that the data is compacted together.

Merging may be performed in response to reach a threshold quantity of static sorted indexes (e.g., 4 static sorted indexes, 8 static sorted indexes, etc.), in response to reaching a threshold quantity of data (e.g., 256 MB, 512 MB, etc.) in the static sorted indexes, periodically (e.g., once an hour, once a day, etc.), upon failure of a replica/node, or based on other criteria.

In some embodiments, compacting the sequential data together may allow the single static sorted index to be compressed. Because some of the data may be static (e.g., cold data in a catalog space), data may be compressed in large blocks (e.g., 64 k). Each block may be compressed and associated with a table to facilitate random block reads. With the compression table, random access decompression may be achieved, which may be transparent to the data structure. By compressing cold data, additional I/O per read may be saved. In some instances, a 10× compression factor may achieved. Compression metadata may specify the compression algorithm (e.g., DEFLATE, LZF, delta encoding, incremental encoding, etc.) as well as static dictionaries to aid in compression (e.g., ZLIB with dictionary).

As illustrated at 210, sequential data from the merged static sorted index may be provided to a new replica. The new replica may be of the same type (B+ Tree) as the plurality of replicas. The new replica may be configured to accept subsequent writes of newly received data such that it is a read/write replica. One or more replicas of the plurality of replicas may be modified to be read only such that the read only replica(s) may be queried but not written to. At the point the sequential data is provided to the new replica at 210, the new replica includes the same data that is on the plurality of replicas, except that the new replica is flatter (e.g., a flatter b-tree) and the data on the new replica is sequentially sorted thereby facilitating faster and cheaper reads. Accordingly, at 220, one or more of the plurality of replicas may be purged/removed. Note that as random writes are performed on the new replica, the new replica may become fragmented. Then, the blocks of FIGS. 1 and 2 may be repeated such that eventually, the new replica may be purged in favor of an even newer replica.

Figure 3:
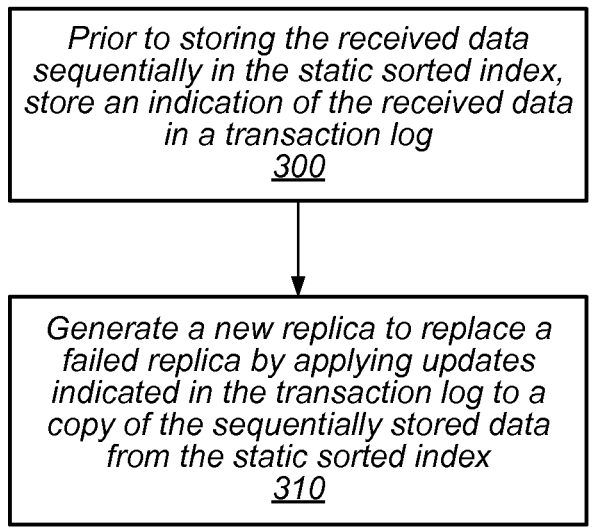
FIG. 3 is a flow diagram of using a static sorted index for disaster recovery, according to some embodiments.

Turning now to FIG. 3, one embodiment of a method for using a static sorted index for disaster recovery is depicted. While the blocks are shown in a particular order for ease of understanding, other orders may be used. In some embodiments, the method of FIG. 3 may include additional (or fewer) blocks than shown. Blocks 300-310 may be performed automatically or may receive user input. Additionally, the method of FIG. 3 may be used in conjunction with one or more blocks of the methods of FIGS. 1-2 and 4.

As shown at 300, prior to storing the received data sequentially in the static sorted index, an indication of the received data may be stored in a transaction log. Storing the indication of the received data in the transaction log may be performed as part of storing the data in the memory tree of the replica. As described herein, the transaction log may, in some embodiments, actually include multiple transaction logs distributed among the plurality of replicas. Each of those logs may include an indication of the data stored in the respective replica. Accordingly, the various logs may collectively store indications of each of the received and stored data.

As noted above, the transaction logs may be used as part of the sequential storing of block 120 of FIG. 1. For example, the transaction log may have ordering information (e.g., an ordered key, a timestamp) that permits the in-memory table data of the various replicas to be serialized into the static sorted index.

In some embodiments, the transaction log(s) may be purged. For example, each time a static sorted index is generated, the transaction log(s) may be purged as the static sorted index includes the updates/inserts/upserts that were indicated in the transaction log(s).

In some instances, however, a replica may fail at some point in time when the transaction log(s) is not empty or purged and includes indications of updates/inserts/upserts that are not reflected in any static sorted index. And as illustrated at 310, a new replica may be generated to replace a failed replica. The new replica may generated by applying updates/inserts/upserts indicated in the transaction log to a copy of the sequentially stored data from the static sorted index. Accordingly, the static sorted index and the transaction log are usable to create a new replica to replace a failed replica.

Figure 4:
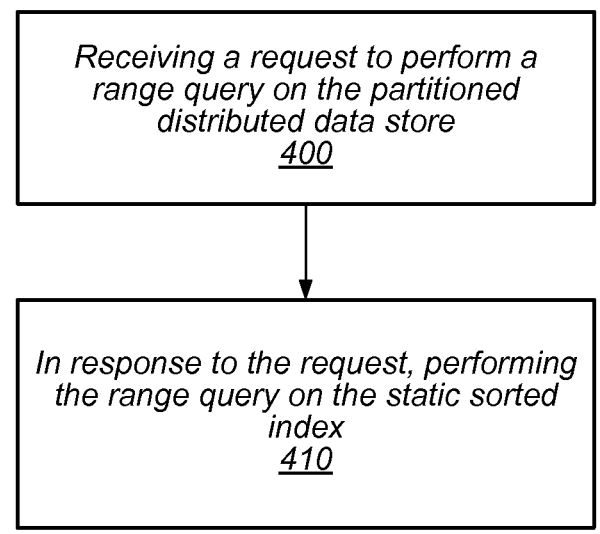
FIG. 4 is a flow diagram of performing queries on a static sorted index, according to some embodiments.

Turning now to FIG. 4, one embodiment of a method for using a static sorted index for performing queries is depicted. While the blocks are shown in a particular order for ease of understanding, other orders may be used. In some embodiments, the method of FIG. 4 may include additional (or fewer) blocks than shown. Blocks 400-410 may be performed automatically or may receive user input. Additionally, the method of FIG. 4 may be used in conjunction with one or more blocks of the methods of FIGS. 1-3.

At 400, a request to perform a range query on the partitioned distributed data store may be received. A range query may be a query from one identifier to another identifier in a partition. As shown at 410, in response to receiving the request to perform the range query, the range query may be performed on the static sorted index.

Requests to perform other types of queries may also be received. Certain types of queries (e.g., range queries) may be more effectively performed (e.g., faster, fewer CPU cycles, etc.) on the static sorted index whereas other types of queries may be more effectively performed on one of the b-tree replicas. In some embodiments, the system may include an intelligent query router that determines a type of the query. In such embodiments, in response to a determination that a query request is a range query, the range query may be performed on the static sorted index as in block 410. For a determination that the query is another type of query, the query may be performed on one of the plurality of replicas.

The disclosed techniques may result in a snapshot of the data in non-fragmented form. This may permit range queries to be answered more efficiently than a fragment B+ Tree on the main replicas, thereby allowing certain operations to be more cost effective on the replica. This may also permit garbage collection and/or disaster recovery to be performed. Moreover, by keeping the other replicas in addition to the static sorted indexes, benefits of the other replicas are maintained, but without the degradation of performance and space of dealing with random writes over time.

Figure 5:
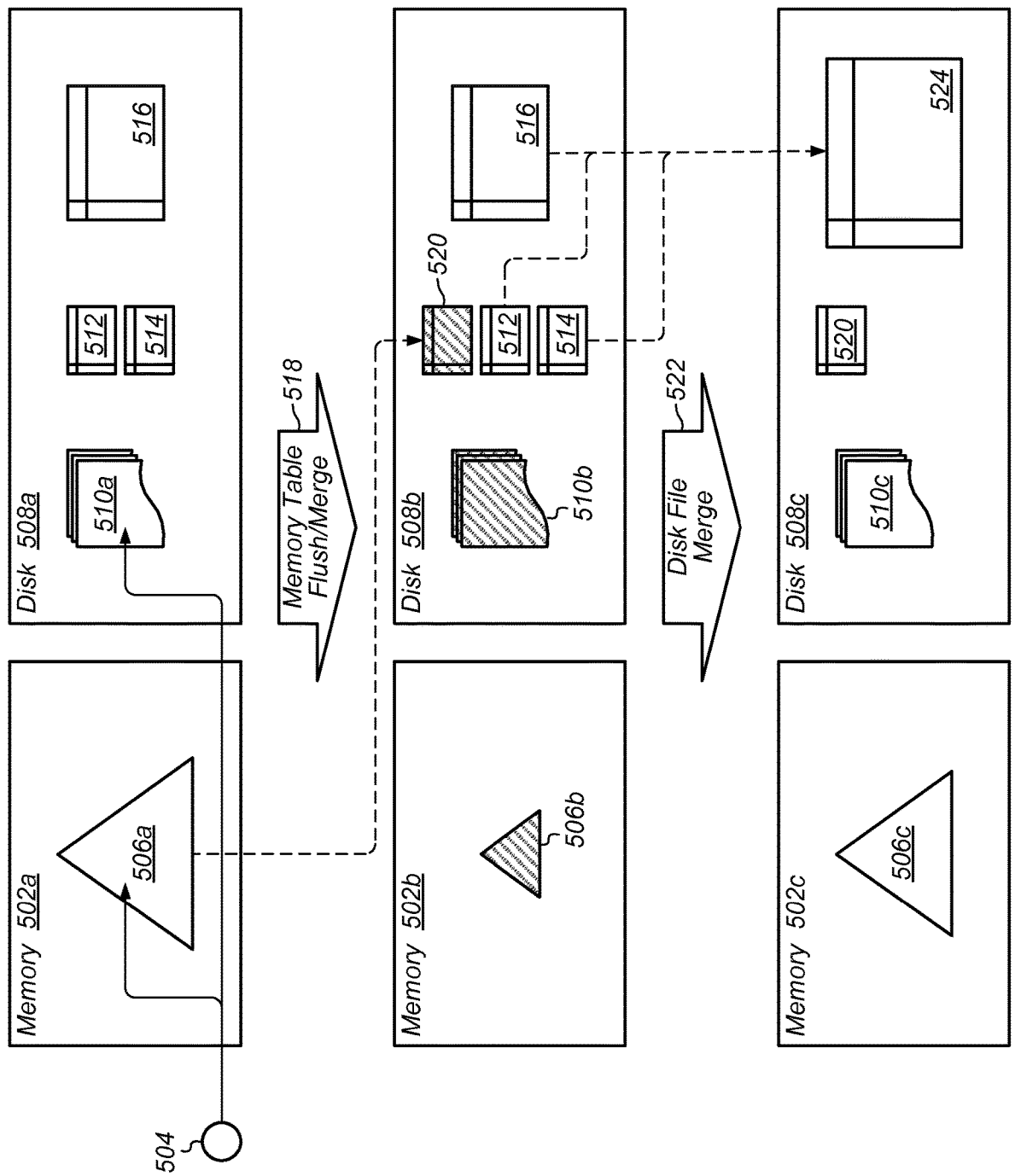
FIG. 5 is a block diagram of a system configured to perform updates and/or merges into a static sorted index, according to some embodiments.

A system that may be configured to perform updates and/or merges into a static sorted index is shown in FIG. 5. FIG. 5 illustrates an example progression from memory 502a and disk 508a to memory 502c and disk 508c, respectively.

At 504, an insert may be committed durably into an in-memory tree 506a (e.g., a b-tree replica) of memory 502a (e.g., partionable data store). The insert, or an indication corresponding to the insert, may be stored in a transaction log 510a. In the example shown, three different static sorted indexes (static sorted index 512, 514, and 516) already exist in disk 508a. At some point, as described herein, a new static sorted index 520 may be created as represented by memory table flush/merge 518 and the dashed line from memory tree 506a to static sorted index 520. The cost of the memory table flush/merge may be the cost of a file append (e.g., to the log) and O(log M) on the in-memory tree (which, if M has a fixed size bound, may be constant with respect to the input size N). The flush into the disk persisted index (e.g., static sorted index 520) may be purely sequential I/O with insertions amortized into a batch operation.

Once the in-memory table is serialized as static sorted index 520, the transaction log may be purged or checkpointed, as shown by the hashed lines in transaction log 510b. Also, at some point, to help ensure that there are not O(N) small index files, the various static sorted indexes may be merged into a single static sorted index as shown by disk file merge 522. The result is single static sorted index 524. In some embodiments, there may be O(log N) static sorted indexes. Once there are more than O(log N), merge may take place. In other embodiments, to try to leverage excess disk bandwidth and excess CPU, the limit on static sorted indexes may be O(1). Note that not all of the static sorted indexes may be merged together. In the example shown, static sorted indexes 512, 514, and 516 may be merged into single static sorted index 524 without merging static sorted index 520. Static sorted index 520 may be merged in a subsequent disk file merge 522. In other embodiments, each of the static sorted indexes may be merged as part of disk file merge 522.

Figure 6:
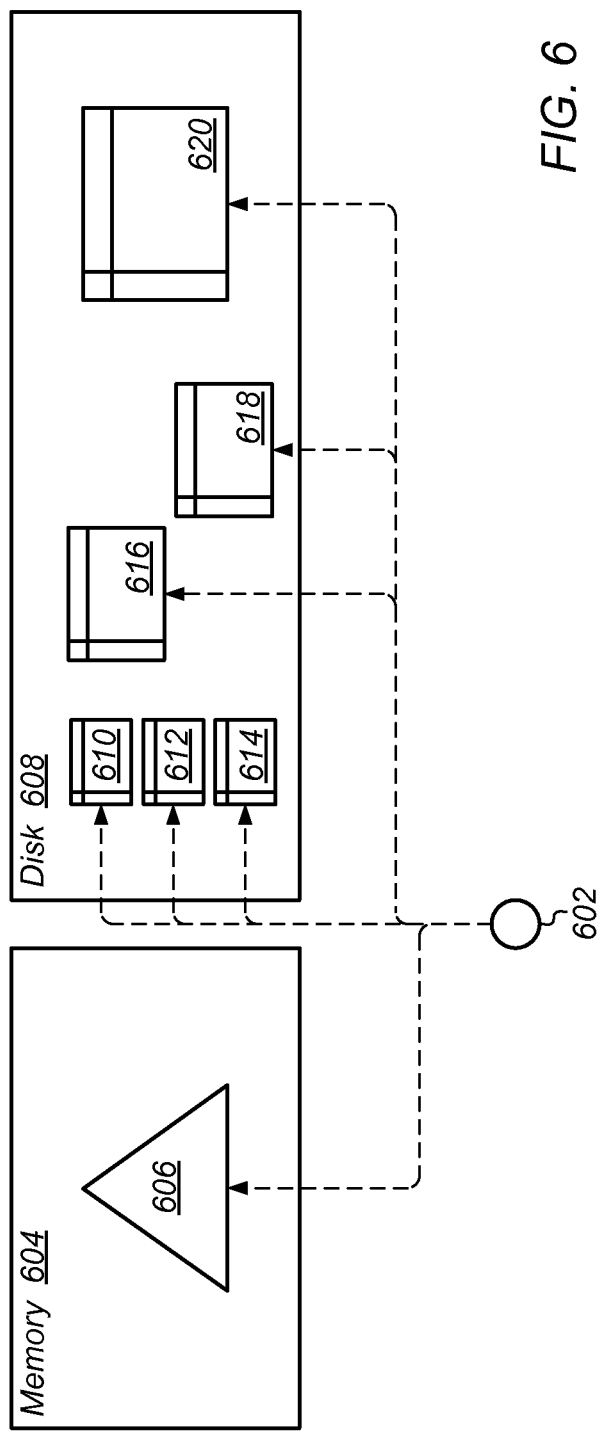
FIG. 6 is a block diagram of a system configured to perform queries on a static sorted index, according to some embodiments.

FIG. 6 is a block diagram of an example system configured to perform queries on a static sorted index. At 602, a query may be performed. The query may include an index lookup on the in-memory tree 606 and each static sorted index file (e.g., static sorted indexes 610, 612, 614, 616, 618, and 620). In some embodiments, a bloom filter may be used to help avoid some of the random seeks on the indexes. The query complexity may be approximately O(log N) disk accesses.

As described herein, the merge process may be configured to reduce the number of static index files thereby limiting the impact of how many random disk I/O operations need to be done for a query. Note that additional sequential I/O bandwidth may be used at the gain of reduced random I/O. Because sequential I/O is generally a richer resource than random I/O, increased performance may result with such a configuration.

Moreover, caching into memory from disk indexes for queries may become easier as a result. Because dirty pages in a B+ Tree index are no longer a concern in a system that utilizes the static sorted indexes, the OS file cache may be relied upon to make hot read queries efficient. Further note that if stale reads are sufficient (as in cold start queries), servicing queries from the oldest generation (e.g., last full merge) may be sufficiently fast.

Figure 7:
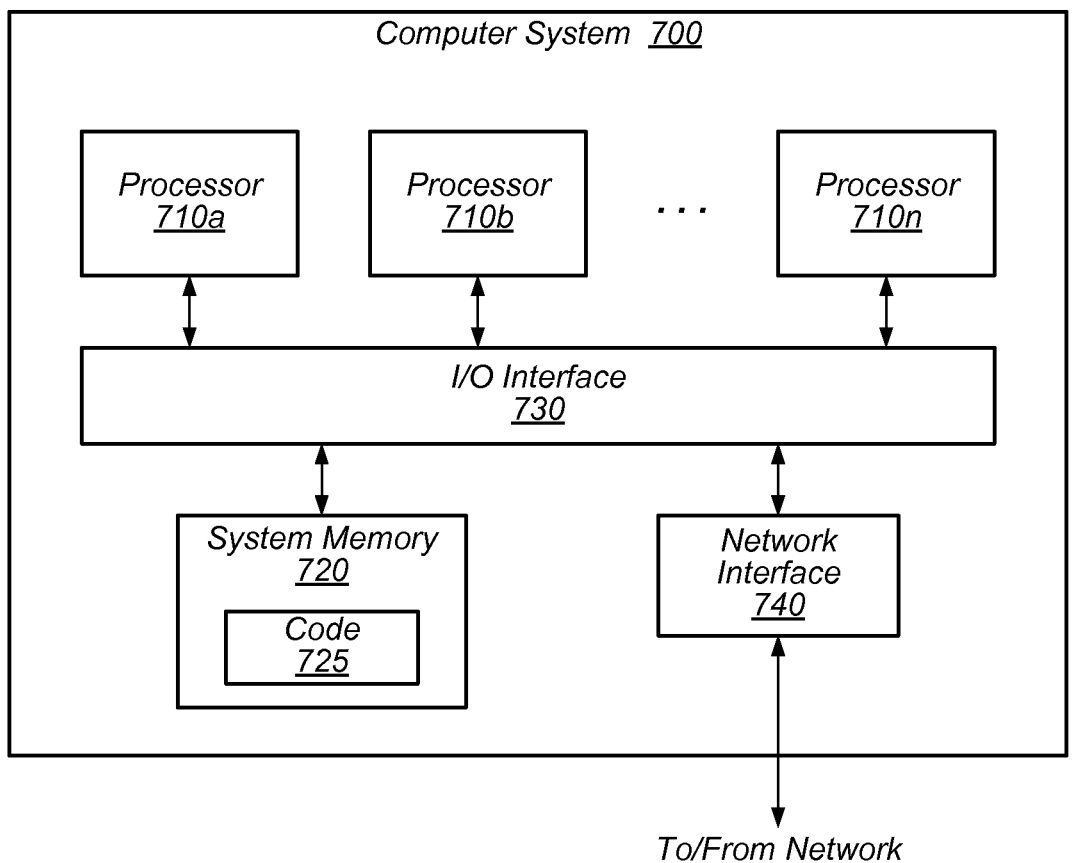
FIG. 7 is a block diagram illustrating a computer system configured to implement static sorted index replication, according to some embodiments.

An embodiment of a computer system including computer-accessible media is illustrated in FIG. 7. As illustrated, computer system 700 includes one or more processors 710 coupled to a system memory 720 via an input/output (I/O) interface 730. Computer system 700 further includes a network interface 740 coupled to I/O interface 730. The disclosed techniques may be implemented using a single instance of computer system 700, while, in other embodiments, multiple such systems may be configured to host different portions or instances of the disclosed techniques. Moreover, in some embodiments, some techniques may be implemented via instances of computer system 700 that are distinct from those instances implementing other techniques.

In various embodiments computer system 700 may be a single processor system including one processor 710, or a multiprocessor system including several processors 710 (e.g., two, four, eight, or another suitable number). Processors 710 may be any suitable processor capable of executing instructions. For example, in various embodiments, processors 710 may be a general-purpose or embedded processor implementing any of a variety of instruction set architectures (ISAs), such as the x96, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by process 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as code 725.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Embodiments may be provided as a computer program product including a non-transitory machine-readable storage medium having stored thereon instructions (in compressed or uncompressed form) that may be used to program a computer (or other electronic device) to perform processes or methods described herein. System memory 720 may be one embodiment of a computer-accessible/machine-readable storage medium configured to store program instructions and data as described above. However, in other embodiments, program instructions and/or data may be received, sent or stored upon different types of computer-accessible media. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet downloaded.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a memory; and
   one or more processors coupled to the memory, wherein the memory comprises program instructions executable by the one or more processors to:
   receive data to store in a distributed data store, wherein the distributed data store includes a plurality of tree-based replicas, wherein individual ones of the tree-based replicas are implemented as respective data structures in a memory tree that refers to leaf nodes of data stored in a fragmented form, and wherein the fragmentation changes in response to write requests;
   store the received data in a respective memory tree of one of the plurality of tree-based replicas, wherein the received data is stored in leaf nodes of the memory tree in the fragmented form;
   generate a static sorted index from the respective memory tree, wherein the static sorted index is generated so that the received data is stored in a sorted order and in a non-fragmented form in the static sorted index, and wherein the static sorted index is made read only after it is generated;
   based at least in part on a determination that a first query to the distributed data store is a range query, perform the first query using the static sorted index; and
   based at least in part on a determination that a second query to the distributed data store is other than a range query, perform the second query using one of the plurality of tree-based replicas.

2. The system of claim 1, wherein the program instructions are further executable by the one or more processors to:
   merge the static sorted index with another static sorted index into a single static sorted index.

3. The system of claim 2, wherein the program instructions are further executable by the one or more processors to:
   compress the single static sorted index.

4. The system of claim 1, wherein the program instructions are further executable by the one or more processors to:
   generate another memory tree for a first replica of the plurality of replicas;
   store the single static sorted index in the other memory tree for the first replica; and
   purge the memory tree of the first replica;
   wherein subsequently received data is storable in the other memory tree for the first replica.

5. The system of claim 1, wherein the program instructions are further executable by the one or more processors to:
   periodically flush at least a portion of data in the respective memory tree of the one replica to respective additional static sorted indexes on persistent storage.

6. The system of claim 1, wherein the determination that the first query is a range query and the determination that the second query is other than a range query is performed at a query router, configured to:
   determine respective types of individual queries to the distributed data store; and
   route the individual queries to the static sorted index or one of the plurality of replicas to perform the query based on the respective types of the queries.

7. The system of claim 1, wherein the program instructions are further executable by the one or more processors to:
   after said store of the received data in the static sorted index:
   receive and store other data in the respective memory tree of one of the plurality of replicas, and
   store an indication of the other data in one or more transaction logs; and
   generate a new replica to replace a failed replica, wherein to generate the new replica the program instructions are further executable by the one or more processors to apply updates corresponding to the stored other data indicated in the one or more transaction logs to a copy of the sequentially stored data from the static sorted index.

8. The system of claim 1, wherein the program instructions are further executable by the one or more processors to:
   prior to said store of the received data in the static sorted index, store an indication of the received data in one or more transaction logs; and
   purge the one or more transaction logs after performing said store of the received data in the static sorted index.

9. The system of claim 1, wherein to store the received data, the program instructions are executable by the one or more processors to store for a plurality of data in a batch operation.

10. The system of claim 1, wherein the static sorted index is implemented as part of a log structured merge (LSM) tree.

11. A method, comprising:
    performing, by one or more computers:
    receiving data to store in a distributed data store, wherein the distributed data store includes a plurality of tree-based replicas, wherein individual ones of the tree-based replicas are implemented as respective data structures in a memory tree that refers to leaf nodes of data stored in a fragmented form, and wherein the fragmentation changes in response to write requests;

storing the received data in a respective memory tree of one of the plurality of tree-based replicas, wherein the received data is stored in leaf nodes of the memory tree in the fragmented form;

generating a static sorted index from the respective memory tree, wherein the static sorted index is generated so that the received data is stored in a sorted order and in a non-fragmented form in the static sorted index, and wherein the static sorted index is made read only after it is generated;

based at least in part on a determination that a first query to the distributed data store is a range query, performing the first query using the static sorted index; and based at least in part on a determination that a second query to the distributed data store is other than a range query, performing the second query using one of the plurality of tree-based replicas.

12. The method of claim 11, further comprising:
merging the static sorted index with another static sorted index into a single static sorted index.

13. The method of claim 12, further comprising:
generating another memory tree for a first replica of the plurality of replicas;
storing the single static sorted index in the other memory tree for the first replica; and
purging the memory tree of the first replica;
wherein subsequently received data is storable in the other memory tree for the first replica.

14. The method of claim 12, further comprising:
compressing the single static sorted index.

15. The method of claim 11, further comprising:
periodically flushing at least a portion of data in the respective memory tree of the one replica to respective additional static sorted indexes on persistent storage.

16. The method of claim 15, wherein individual ones of the periodic flushes are performed in response to a determination that a particular amount of data has been received by the respective memory tree.

17. The method of claim 11, further comprising:
prior to said storing, storing an indication of the received data in one or more transaction logs; and
purging the one or more transaction logs after performing said storing.

18. The method of claim 11, wherein the storing is performed as a batch operation.

19. The method of claim 11, wherein the static sorted index is implemented as part of a log structured merge (LSM) tree.

20. A non-transitory computer-readable storage medium storing program instructions, wherein the program instructions are computer-executable to implement:

receiving data to store in a distributed data store, wherein the distributed data store includes a plurality of tree-based replicas, wherein individual ones of the tree-based replicas are implemented as respective data structures in a memory tree that refers to leaf nodes of data stored in a fragmented form, and wherein the fragmentation changes in response to write requests;

storing the received data in a respective memory tree of one of the plurality of tree-based replicas, wherein the received data is stored in leaf nodes of the memory tree in the fragmented form;

generating a static sorted index from the respective memory tree, wherein the static sorted index is generated so that the received data is stored in a sorted order and in a non-fragmented form in the static sorted index, and wherein the static sorted index is made read only after it is generated;

based at least in part on a determination that a first query to the distributed data store is a range query, performing the first query using the static sorted index; and based at least in part on a determination that a second query to the distributed data store is other than a range query, performing the second query using one of the plurality of tree-based replicas.

* * * * *